(12) United States Patent
Hindy et al.

(10) Patent No.: US 11,387,887 B2
(45) Date of Patent: Jul. 12, 2022

(54) METHOD AND APPARATUS FOR GENERATING A CHANNEL STATE INFORMATION REPORT

(71) Applicant: Lenovo (Singapore) Pte. Ltd., New Tech Park (SG)

(72) Inventors: Ahmed Hindy, Forest Park, IL (US); Tyler Brown, Lake Zurich, IL (US); Udar Mittal, Rolling Meadows, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 40 days.

(21) Appl. No.: 16/833,673

(22) Filed: Mar. 30, 2020

(65) Prior Publication Data
US 2020/0313744 A1 Oct. 1, 2020

Related U.S. Application Data

(60) Provisional application No. 62/825,481, filed on Mar. 28, 2019.

(51) Int. Cl.
*H04B 7/06* (2006.01)
*H04L 1/16* (2006.01)

(52) U.S. Cl.
CPC ......... *H04B 7/0634* (2013.01); *H04B 7/0617* (2013.01); *H04B 7/0626* (2013.01); *H04L 1/1614* (2013.01)

(58) Field of Classification Search
CPC .................................................. H04B 7/0634
(Continued)

(56) References Cited

U.S. PATENT DOCUMENTS

| 6,874,062 | B1 * | 3/2005 | Goldberg | G06F 3/0613 |
| | | | | 707/999.003 |
| 2008/0232823 | A1 * | 9/2008 | Jansen | H04B 10/505 |
| | | | | 398/204 |

(Continued)

FOREIGN PATENT DOCUMENTS

| WO | 2019029675 A1 | 2/2019 |
| WO | 2020061981 A1 | 4/2020 |

OTHER PUBLICATIONS

PCT International Search Report for PCT/IB2020/052990, Lenovo (Singapore) Pte. Ltd., dated—Jun. 16, 2020.

*Primary Examiner* — Lihong Yu
(74) *Attorney, Agent, or Firm* — Loppnow & Chapa

(57) ABSTRACT

A method and apparatus are provided for generating a channel state information report having information corresponding to a set of layers. The method includes receiving a set of reference signals transmitted from a network including at least one base station. A set of beams are identified based on the set of reference signals. A pair of amplitude and phase coefficient vectors are obtained by transforming the received set of reference signals, wherein each pair of the amplitude and phase coefficient vectors corresponds to a beam in the set of beams in each layer of the set of layers. The layers from the set of layers are partitioned into a set of layer-groups. A beam bitmap vector is generated for each layer-group indicating a subset of a selected set of beams within the layer-group. A coefficient bitmap vector is generated for each of the selected set of beams in each layer indicating the coefficients with non-zero amplitude values, based on the beam bit map vector. The channel state information report is transmitted to the network, the channel state information report including at least the beam bitmap vector and the coefficient bitmap vector.

20 Claims, 9 Drawing Sheets

(58) Field of Classification Search
USPC .......................................................... 370/329
See application file for complete search history.

(56) References Cited

U.S. PATENT DOCUMENTS

2018/0167116 A1      6/2018  Rahman et al.
2020/0367083 A1*    11/2020  Hao ..................... H04B 7/0469

* cited by examiner

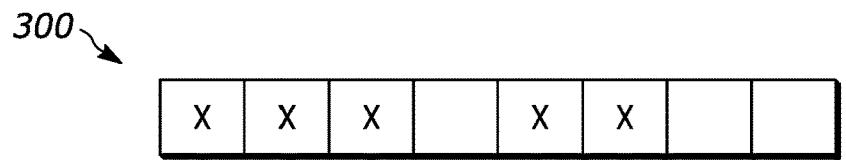

FIG. 3

$$\text{LET } BP_{G1} = \begin{bmatrix}1\\1\\0\\1\\1\\1\\0\\0\end{bmatrix}, BP_{G2} = \begin{bmatrix}1\\1\\1\\0\\1\\0\\1\\1\end{bmatrix}$$

FIG. 4

$$BP_X = \begin{bmatrix}1\\1\\0\\1\\1\\1\\0\\0\end{bmatrix} \text{ XOR } \begin{bmatrix}1\\1\\1\\0\\1\\0\\1\\1\end{bmatrix} = \begin{bmatrix}0\\0\\1\\1\\0\\1\\1\\1\end{bmatrix}$$

FIG. 5

$$BP_{G2} = \text{XOR}(BP_X, BP_{G1}) \begin{bmatrix}0\\0\\1\\1\\0\\1\\1\\1\end{bmatrix} \text{ XOR } \begin{bmatrix}1\\1\\0\\1\\1\\1\\0\\0\end{bmatrix} = \begin{bmatrix}1\\1\\1\\0\\1\\0\\1\\1\end{bmatrix}$$

FIG. 6

$$\text{LET } BP_{G1} = \begin{bmatrix} 1 \\ 1 \\ 0 \\ 1 \\ 1 \\ 1 \\ 0 \\ 0 \end{bmatrix}, BP_{G2} = \begin{bmatrix} 1 \\ 1 \\ 0 \\ 0 \\ 1 \\ 0 \\ 1 \\ 1 \end{bmatrix}$$

FIG. 7

$$BP_X = \begin{bmatrix} 1 \\ 1 \\ 0 \\ 1 \\ 1 \\ 1 \\ 0 \\ 0 \end{bmatrix} \text{XOR} \begin{bmatrix} 1 \\ 1 \\ 0 \\ 0 \\ 1 \\ 0 \\ 1 \\ 1 \end{bmatrix} = \begin{bmatrix} 0 \\ 0 \\ 0 \\ 1 \\ 0 \\ 1 \\ 1 \\ 1 \end{bmatrix}$$

FIG. 8

$$BP_{G2} = XOR(BP_X, BP_{G1}) \begin{bmatrix} 0 \\ 0 \\ 0 \\ 1 \\ 0 \\ 1 \\ 1 \\ 1 \end{bmatrix} \text{XOR} \begin{bmatrix} 1 \\ 1 \\ 0 \\ 1 \\ 1 \\ 1 \\ 0 \\ 0 \end{bmatrix} = \begin{bmatrix} 1 \\ 1 \\ 0 \\ 0 \\ 1 \\ 0 \\ 1 \\ 1 \end{bmatrix}$$

FIG. 9

| | Scheme 1 (simple) | Scheme 2 (moderate) | Scheme 3 (complex) |
|---|---|---|---|
| Scheme Description | 2 Bitmaps $BP_{G1}$, $BP_{G2}$ of length 2L for each layer-group, placed in UCI-P1.<br><br>$BP_{GK}$ indicates the number of beams utilized for layer-group k | A scalar value $q'_L$ (representing all possible values for $L_{G1}+L_{G2}$) is reported in UCI-P1 using $\lceil \log_2 q'_L \rceil$ bits, where $L_{GK}$ is the total number of beams utilized for layer-group k.<br><br>Two 2L-bitmaps, $BP_{G1}$, $BP_{G2}$ are transmitted via UCI-P2 | One 2L-bitmap, $BP_X$, is included in UCI-P1, where $BP_X = BITXOR(BP_{G1}, BP_{G2})$.<br><br>$BP_{G1}$ is transmitted in UCI-P2.<br><br>$BP_{G2}$ can be computed given $BP_X, BP_{G1}$:<br><br>$BP_{G2} = BITXOR(BP_X, BP_{G1})$ |
| Overhead | UCI-P1: 4L bits<br>UCI-P2: 0 bits<br>UCI-Total: 4L bits | UCI-P1: $\lceil \log_2 q'_L \rceil$ bits<br>UCI-P2: 4L bits<br>UCI-Total: $\lceil \log_2 q'_L \rceil$ +4L bits | UCI-P1: 2L bits<br>UCI-P2: 2L bits<br>UCI-Total: 4L bits |
| Advantage(s) | 1. Least UCI bits in total (same as Scheme 3).<br>2. No loss if one or more beams are not utilized in any layer. | 1. Least bits in UCI-P1<br>2. L* is not needed if the total number of beams used across layers is higher-layer configured.<br>3. No loss if one or more beams are not utilized in any layer. | 1. Least UCI bits in total (same as Scheme 1).<br>2. Less bits in UCI-P1 than Scheme 1. |

FIG. 10A

| Disadvantage(s) | 1. Most UCI-P1 bits.<br>2. If $R \leq 2$, All 4L bits used in UCI-P1 are useless | 1. Most UCI bits in total.<br>2. If $R \leq 2$, the $\lceil \log_2 q'_L \rceil$ bits used in UCI-P1 are useless | 1. More bits in UCI-P1 than Scheme 2.<br>2. Sub-optimal for case where one or more beams are unutilized by any layer (loss of $(R-2)2ML_X$ bits for $L_X$ unutilized beams). However $L_X$ is presumed to be small (possibly zero) when $R>2$.<br>3. If $R \leq 2$, the 2L bits used in UCI-P1 are useless |

FIG. 10B

|  | Scheme 2 (moderate) | Scheme 3 (complex) |
|---|---|---|
| Scheme Description | One UCI-P1 parameter of size $\lceil \log_2 q''_L \rceil$ bits is needed to report the sizes of the pair $\{L_{G1}, L_{G2}\}$, where $q''_L$ represents all possible values for the pair, in addition to $\lceil \log_2 |\alpha_M| \rceil$ bits in UCI-P1 to indicate the FD basis size for each layer-group<br><br>Two 2L-bitmaps, $BP_{G1}$, $BP_{G2}$ are transmitted in UCI-P2 | One 2L-bitmap, $BP_X$, is included in UCI-P1, where $BP_X = \text{BITXOR}(BP_{G1}, BP_{G2})$.<br>Also, one extra UCI-P1 parameter of size $\lceil \log_2 q^*_L \rceil$ bits is needed to report the size of either $L_{G1}$ (or $L_{G2}$). Thereby $q^*_L$ represents all possible values for utilized beams in either layer-group Hence, $L_{G2} = 2nz(BP_X) + nnz(BP_X) - L_{G1}$<br>In addition, $\lceil \log_2 |\alpha_M| \rceil$ bits are needed in UCI-P1 to indicate the FD basis size for each layer-group.<br>One bitmap $BP_{G1}$ is transmitted in UCI-P2. |
| Overhead | UCI-P1: $\lceil \log_2 q''_L \rceil + \lceil \log_2 |\alpha_M| \rceil$ bits<br>UCI-P2: 4L bits<br>UCI-Total: $\lceil \log_2 q''_L \rceil + \lceil \log_2 |\alpha_M| \rceil + 4L$ bits | UCI-P1: $\lceil \log_2 q^*_L \rceil + \lceil \log_2 |\alpha_M| \rceil + 2L$ bits<br>UCI-P2: 2L bits<br>UCI-Total: $\lceil \log_2 q^*_L \rceil + \lceil \log_2 |\alpha_M| \rceil + 4L$ bits |

FIG. 11

METHOD AND APPARATUS FOR GENERATING A CHANNEL STATE INFORMATION REPORT

FIELD OF THE INVENTION

The present disclosure is directed to a method and apparatus related to generating a channel state information report, including the generation of a channel state information report having information corresponding to a set of layers, where a beam bitmap vector for a group of layers indicates a subset of the selected set of beams for the group of layers.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, user equipment can make use of channel state information codebooks, which help to define the nature of the adopted beams, which are used to support a particular data connection. Higher rank codebooks can sometimes be used to enhance system performance, but often at the price of an increase in the amount of feedback overhead.

In at least some wireless communication systems, channel state information (CSI) feedback is used to report on current channel conditions. This can be increasingly useful in frequency division duplexing (FDD) and frequency division multiple access (FDMA) systems where the downlink (DL) and uplink (UL) channels are not reciprocal. With multi-user (MU)-MIMO and spatial multiplexing, a receiving device, such as a user equipment (UE), may need to report channel conditions for multiple channels or beams. Accordingly, much overhead may be dedicated to CSI reporting in MU-MIMO and spatial multiplexing systems.

The present inventors have recognized that improved methods for efficiently coding a channel state information report may be beneficial, as well as apparatuses and systems that perform the functions of the methods. The present inventors have further recognized that one such method can include communicating with a network using spatial multiplexing, which includes one or more base stations. Here, multiple transmission layers may be transmitted at a time, each transmission layer comprising multiple beams, which can be arranged into one or more layer-groups. A beam bitmap vector for each layer-group can indicate a subset of the selected set of beams that have a coefficient bitmap vector included as part of a channel state information report transmitted to the network.

SUMMARY

The present application provides a method in a user equipment for generating a channel state information report having information corresponding to a set of layers. The method includes receiving a set of reference signals transmitted from a network including at least one base station. A set of beams are identified based on the set of reference signals. A pair of amplitude and phase coefficient vectors are obtained by transforming the received set of reference signals, wherein each pair of the amplitude and phase coefficient vectors corresponds to a beam in the set of beams in each layer of the set of layers. The layers from the set of layers are partitioned into a set of layer-groups. A beam bitmap vector is generated for each layer-group indicating a subset of a selected set of beams within the layer-group. A coefficient bitmap vector is generated for each of the selected set of beams in each layer indicating the coefficients with non-zero amplitude values, based on the beam bit map vector. The channel state information report is transmitted to the network, the channel state information report comprising at least the beam bitmap vector and the coefficient bitmap vector.

According to another possible embodiment, a user equipment for generating a channel state information report having information corresponding to a set of layers is provided. The user equipment includes a transceiver that receives a set of reference signals transmitted from a network including at least one base station. The user equipment further includes a controller that identifies a set of beams based on the set of reference signals, and obtains a pair of amplitude and phase coefficient vectors by transforming the received set of reference signals, wherein each pair of the amplitude and phase coefficient vectors corresponds to a beam in the set of beams in each layer of the set of layers. The controller further partitions the layers from the set of layers into a set of layer-groups, generates a beam bitmap vector for each layer-group indicating a subset of a selected set of beams within the layer-group, and generates a coefficient bitmap vector for each of the selected set of beams in each layer indicating the coefficients with non-zero amplitude values, based on the beam bit map vector. The transceiver further transmits the channel state information report to the network, the channel state information report including at least the beam bitmap vectors and the coefficient bitmap vectors.

According to a further possible embodiment, a method in a network including at least one base station is provided for receiving a generated channel state information report having information corresponding to a set of layers from a user equipment. The method includes transmitting a set of reference signals transmitted to the user equipment. A set of beams are identified based on the set of reference signals. A pair of amplitude and phase coefficient vectors are obtained by transforming the received set of reference signals, where each pair of the amplitude and phase coefficient vectors corresponds to a beam in the set of beams in each layer of the set of layers. The layers from the set of layers are partitioned into a set of layer-groups. A beam bitmap vector is generated for each layer-group indicating a subset of a selected set of beams within the layer-group. A coefficient bitmap vector is generated for each of the selected set of beams in each layer indicating the coefficients with non-zero amplitude values, based on the beam bit map vector. The channel state information report is received from the user equipment, the channel state information report including at least the beam bitmap vectors and the coefficient bitmap vectors.

According to a still further possible embodiment, a network including at least one base station for receiving a generated channel state information report having information corresponding to at least one layer is provided. The network includes at least one transceiver that transmits a set of reference signals transmitted to the user equipment. A set of beams are identified based on the set of reference signals. A pair of amplitude and phase coefficient vectors are obtained by transforming the received set of reference signals, where each pair of the amplitude and phase coefficient vectors corresponds to a beam in the set of beams in each layer of the set of layers. The layers from the set of layers are partitioned into a set of layer-groups. A beam bitmap vector is generated for each layer-group indicating a subset of a selected set of beams within the layer-group. A coefficient bitmap vector is generated for each of the selected set of beams in each layer indicating the coefficients with non-zero amplitude values, based on the beam bitmap vector. The at least one transceiver further receives the channel state information report from the user equipment, the channel state information report comprising at least the beam bitmap vectors and the coefficient bitmap vectors.

These and other features, and advantages of the present application are evident from the following description of one or more preferred embodiments, with reference to the accompanying drawings.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is an example of a bit map diagram of size 2L, where an 'x' indicates the location of a utilized beam for a given layer group;

FIGS. 4-6 are bit map diagrams identifying utilized beams for a pair of layer-groups, as well as a composite bit map diagram representative of multiple layer-groups, which is formed using an exclusive-or operation, in accordance with a first example;

FIGS. 7-9 are bit map diagrams identifying utilized beams for a pair of layer-groups, as well as a composite bit map diagram representative of multiple layer-groups, which is formed using an exclusive-or operation, in accordance with a second example;

FIGS. 10A and 10B are a table comparing multiple schemes for a case having arbitrary beams per layer group with fixed frequency domain basis size after frequency compression, across layer-groups;

FIG. 11 is a table comparing multiple schemes for a case having arbitrary beams per layer group with an unequal frequency domain basis size after frequency compression, across layer-groups, where the frequency domain basis size for layer-group 2 is less than (or equal) the frequency domain basis size for layer group 1;

DETAILED DESCRIPTION OF THE PREFERRED EMBODIMENT(S)

Figure 1:
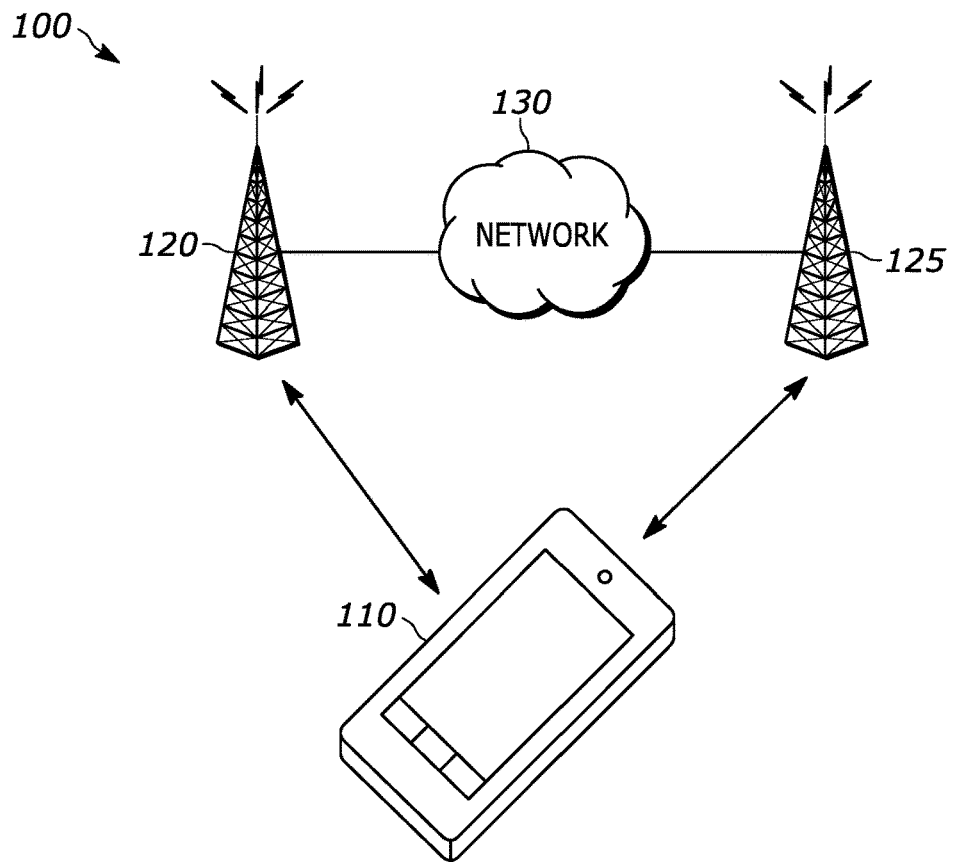
FIG. 1 is an example block diagram of a system according to a possible embodiment.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for generation of a channel state information report, including the generation of a channel state information report having information corresponding to a set of layers.

FIG. 1 is an example block diagram of a system 100 according to a possible embodiment. The system 100 can include a User Equipment (UE) 110, at least one network entity 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

In 3GPP New Radio (NR) systems, Type-I and Type-II codebook-based channel state information (CSI) feedback have been adopted to support advanced MIMO transmission. Both types of codebooks are constructed from two-dimensional discrete Fourier transform (DFT)-based grid of beams and enable the CSI feedback of beam selection as well as phase shift keying (PSK) based co-phase combining between two polarizations. Type-I codebooks are used for standard resolution CSI feedback, while Type-II codebooks are used for high resolution CSI feedback. As a result, it is envisioned that more accurate CSI can be obtained from Type-II codebook-based CSI feedback so that enhanced precoded MIMO transmission can be employed by the network.

Type-II codebook was described to handle up to two MIMO layers per transmission, given the large amount of CSI feedback overhead that is generally associated with each layer. Extending the Type-II codebook framework to include more than two layers could result in significant additional overhead to handle transmission.

A number of techniques have been proposed to reduce the CSI feedback overhead of Type-II codebook for up to rank-2 transmission. These techniques vary in nature from spatial compression, frequency compression, as well as omitting coefficients with relatively small amplitude.

Assuming the gNB is equipped with a two-dimensional (2D) antenna array with $N_1$, $N_2$ antenna ports per polarization placed horizontally and vertically and communication occurs over $N_3$ pre-coding matrix indicator (PMI) subbands, a PMI subband can include a set of resource blocks, each resource block having a set of subcarriers. In order to reduce the uplink (UL) feedback overhead, a discrete Fourier transform (DFT)-based CSI compression of the spatial domain is applied to L beams per polarization, where $L<N_1N_2$. Similarly, additional compression in the frequency domain is applied, where each beam of the frequency-domain precoding vectors is transformed using an inverse DFT matrix to the delay domain, and the magnitude and phase values of a subset of the delay-domain coefficients are selected and fed back to the gNB as part of the CSI report. The $2N_1N_2 \times N_3$ codebook per layer r takes on the form $$W^{(r)} = W_1 \tilde{W}_2^{(r)} W_3^{(r)H},$$

where $W_1$ is a $2N_1N_2 \times 2L$ block-diagonal matrix ($L<N_1N_2$) with two identical diagonal blocks, i.e., $$W_1 = \begin{bmatrix} B & 0 \\ 0 & B \end{bmatrix},$$

and B is an $N_1N_2 \times L$ matrix with columns drawn from a 2D oversampled DFT matrix, as follows.

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix},$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T,$$

$$B = [v_{l_0,m_0} \ v_{l_1,m_1} \ \cdots \ v_{l_{L-1},m_{L-1}}],$$

$$l_i = O_1 n_1^{(i)} + q_1, 0 \le n_1^{(i)} < N_1, 0 \le q_1 < O_1 - 1,$$

$$m_i = O_2 n_2^{(i)} + q_2, 0 \le n_2^{(i)} < N_2, 0 \le q_2 < O_2 - 1,$$

where the superscript $^T$ denotes a matrix transposition operation. Note that $O_1$, $O_2$ oversampling factors are assumed for the 2D DFT matrix from which matrix B is drawn. Note that $W_1$ is common across all layers. $W_f$ is an $N_3 \times M$ matrix ($M<N_3$) with columns selected from a critically-sampled size-$N_3$ DFT matrix, as follows $$W_f = [f_{k_0} \ f_{k_1} \ \cdots \ f_{k_{M-1}}], \ 0 \le k_i < N_3 - 1,$$

$$f_k = \begin{bmatrix} 1 & e^{-j\frac{2\pi k}{N_3}} & \cdots & e^{-j\frac{2\pi k(N_3-1)}{N_3}} \end{bmatrix}^T.$$

Only the indices of the L selected columns of B are reported, along with the oversampling index taking on $O_1O_2$ values. Similarly for $W_F$, only the indices of the M selected columns out of the predefined size-$N_3$ DFT matrix are reported. Hence, L, M represent the equivalent spatial and frequency dimensions after compression, respectively. Finally, the $2L \times M$ matrix $\tilde{W}_2^{(r)}$ represents the linear combination coefficients (LCCs) of the spatial and frequency DFT-basis vectors. Both are $\tilde{W}_2^{(r)}$ and $W_3^{(r)}$ and independent for different layers. Magnitude and phase values of an approximately β fraction of the 2LM available coefficients are reported to the gNB (β<1) as part of the CSI report, where coefficients with zero magnitude are indicated via a per-layer coefficients bitmap. Since all coefficients reported within a layer is normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported. Hence, for a single-layer transmission, magnitude and phase values of a maximum of $\lceil 2\beta LM \rceil - 1$ coefficients (along with the indices of selected L, MDFT vectors) are reported per layer, which can lead to a meaningful reduction in the CSI report size.

For a Type-II codebook, the UE reports the indices of the non-zero coefficients per layer that characterize the precoder across two transformed bases representing the spatial and frequency dimensions of the codebook. The non-zero coefficient indices are reported in the form of a two-dimensional bitmap of size $2L \times M$ for each layer, where L, M indicate the per-polarization spatial and frequency basis dimensions after compression, respectively. For dual-polarized antennas, a total of 2L beams are indicated per layer. The number of non-zero coefficients to be reported per layer ($K_1$) is parameterized by a higher-layer parameter β, which satisfies $K_1 \le 2LM\beta$, where β<1, i.e., the number of channel coefficients being fed back to the gNB is a fraction of the total coefficients. This implies that the $2L \times M$ bitmap can be a sparse matrix, with possibly one or more rows (beams) or columns (frequency units) being all zeros. Note that the bitmap size can be significant compared with the total overhead, e.g., for rank-4 transmission with typical values of L=4, M=7, the bitmaps can contribute to up to 224 overhead bits.

Figure 2:
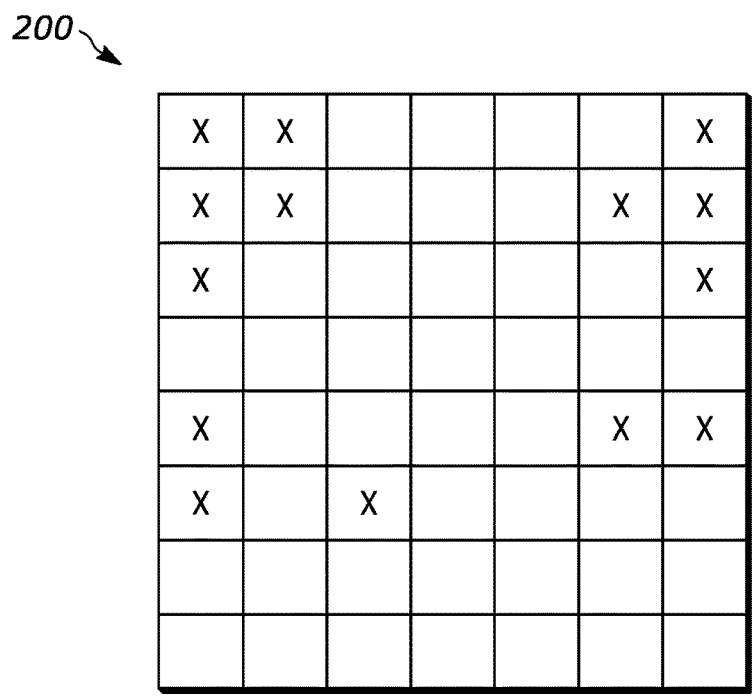
FIG. 2 is an example of a bit map diagram of size 2L×M, where an 'x' corresponds to the location of a non-zero coefficient for a given layer.

One example for a case with L=4, M=7 is illustrated in FIGS. 2 and 3. FIG. 2 illustrates a size $2L \times M$ bitmap, where x corresponds to non-zero coefficient locations. This bitmap corresponds to a case where $K_0 = \lceil \beta 2LM \rceil = 14$ non-zero coefficients are reported at β=¼. Hence, there is a possibility that the bitmap matrix is sparse with many rows and/or columns that are unutilized.

If somehow we can report the indices of the unutilized beams, this would help further reduce the overhead. For example, we can introduce a new bitmap of size 2L that indicates the utilized beams as illustrated in FIG. 3.

In the case of the illustrated example, we can see that L'=5 bits across both polarizations are utilized, and that the overhead of reporting the coefficients' locations can drop from 2LM=56 bits to L'M+2L=43 bits, and hence 13 bits can be saved. For a Rank-4 transmission, an overall of 52 bits can be reduced in overhead, where this approach involves no loss of information.

In the sequel, the notion of layer-group is used, where a layer-group represents a set of one or more beams. One possible setup is grouping layers 1, 2 into one layer group (Layer Group 1) and layers 3, 4 into another layer group (Layer Group 2).

Cases where reducing the 2L×M bitmap size may be beneficial can include instances in which:
1. The number of non-zero coefficients ($K_1$) within a layer is small compared with 2LM, especially at Rank R>2, i.e., many rows will be all zeros with high probability. Hence, it would be more efficient to have a smaller bitmap for each layer that includes the utilized beams only.
2. Possible scenarios for Rank 3-4 transmission include orthogonal beams across layers/layer-groups, or in a more general setup partially overlapping beams, i.e., only a subset of the beams is allowed to be reused across layers/layer-groups. In such scenarios, multiple beams would be unutilized for a layer/layer-group, and hence it makes sense to use a bitmap for each layer that does not include these omitted beams.
3. One possible scenario for Rank 3-4 transmission is utilizing the smallest subset of beams that comprise x % of the total WB power of the channel, where $x \in [0,100]$. In such a case, a subset of the beams is only utilized for each layer/layer-group and hence it is more efficient to have a smaller bitmap for each layer.

Feedback in Type-II CSI is being reported in two consecutive parts in the uplink control information (UCI): UCI part 1 with typically a fixed size, which is usually small and is used to report parameters that indicate the size of the remainder of the feedback information, and UCI part 2 with typically a variable size (parameterized by the content in UCI part 1). Hence, any parameter that would signal a potential reduction in overhead size will generally need to be reported in UCI part 1.

In accordance with the present application different embodiments that aim at reducing the overhead of each of the bitmaps for rank 3-4 transmission via reporting auxiliary information that enables reducing the coefficients bitmap overhead without loss of information are proposed. More specifically, three different schemes are proposed. The first scheme aims at reducing the total overhead bits in the system. The second scheme attempts to prioritize the reduction of the overhead included as part of UCI part 1, whereas the third scheme attempts a more balanced approach between minimizing the UCI part 1 overhead and the total overhead corresponding to the bitmap information.

For ease of exposition, we discuss the proposed schemes for up to rank 4 transmission, where beams are utilized in a layer-group manner, e.g., layers 1, 2 utilize a common subset of spatial beams, whereas layers 3, 4 can utilize a different subset of the beams, where both subsets are not necessarily disjoint. Extension to the layer-based case, i.e., each layer is associated with its own subset of beams, is also covered.

Embodiment 1: Reporting a Beam Bitmap for Each Layer-Group in UCI Part 1

In this approach a bitmap of size 2L, which we name a beam bitmap, is reported for each layer group in UCI part 1, where a zero value in the $i^{th}$ location of the beam bitmap indicates that all coefficient values corresponding to the $i^{th}$ beam location are not reported for any of the layers within the layer group corresponding to this beam bitmap. Assuming that the two beam bitmaps have $L_{G1}$, $L_{G2}$ non-zero locations, then layer groups 1, 2 utilize $L_{G1}$<2L and $L_{G2}$<2L beams, respectively, such as for rank 4 transmission, bitmaps of sizes $L_{G1}M$, $L_{G1}M$, $L_{G2}M$ and $L_{G2}M$ for layers 1 to 4, respectively, compared with a total of 8LM bits.

At least one advantage of this approach is that the two beam bitmaps provide full information on the number of beams utilized for each layer group (for proper allocation of UCI part-2 size) as well as the indices of such beams (for proper mapping of beams). One potential drawback, however, is that all of the overhead (a total of 4L bits) will generally be allocated in UCI part 1, which may be desired to be small.

This approach can be generalized to the layer-based case, wherein for the case of R layers being reported, R beam bitmaps would be reported in UCI part 1.

Embodiment 2: Reporting the Total Number of Beams Utilized in UCI Part 1

In this approach only the total number of beams utilized across both layer groups is reported in UCI part 1. This number typically requires $\lceil \log_2 q'_L \rceil$ to be signaled, where $q'_L$ represents the total number of possible values for the sum of beams utilized across layer groups, which is sufficient to indicate the bitmap sizes to be included as part of UCI part 2. In addition, two 2L bitmaps corresponding to the two layer groups would still be signaled in UCI part 2 to indicate the locations of the utilized beams per layer group.

While this approach will often consume more overhead bits when compared to the previous approach ($\lceil \log_2 q'_L \rceil$ more bits), it will typically have less UCI part 1 bits when compared to the prior embodiment, which in some instances may be an important design criterion.

This approach can be generalized to the layer-based case with R layers, where $q'_L$ would represent the total number of beams utilized across layers, and R beam bitmaps of size 2L each would be reported in UCI part 2.

Embodiment 3: Reporting One Beam Bitmap in UCI Part 1

In this approach, one bitmap that indicates the beam utilization is reported in UCI part 1. In the case of two layers/layer groups, a bit-XOR of the beam bitmaps of layer group 1 and layer group 2, which we call $BP_x$, is reported. Note that beams that are shared by both layer groups will be indicated by zeros in $BP_x$, whereas all other beams in the XOR beam bitmap will be represented by ones. An upper bound on the total number of beams utilized can then be deduced from $BP_x$ (2L+no. of zero entries in $BP_x$). The advantage of reporting $BP_x$ in UCI part 1 over directly reporting the total number of beams is that $BP_x$ comprises information about both bitmaps of layer groups 1, and 2 (we call them $BP_{G1}$ and $BP_{G2}$ in the sequel). $BP_{G2}$ can be realized given $BP_{G1}$ and $BP_x$, i.e., $BP_{G2}$=bit-XOR($BP_{G1}$, $BP_{G2}$). Hence, only $BP_{G1}$ needs to be reported in UCI part 2.

More generally, this approach involves reporting a bitwise map $BP_x$ of size 2L in UCI part 1 that comprises information on the total number of beams utilized across layer-groups, as well as information on the bitmaps for layers/layer-groups.

Only R−1 bitmaps would then be generally needed in UCI part 2 in the case of R layers/layer-groups.

Extension to the Case with Arbitrary Frequency Domain (FD) Basis Size for Each Layer/Layer-Group:

The aforementioned schemes in Embodiment 1 through Embodiment 3 can be generalized to the case where the FD basis size for each layer/layer-group is not necessarily the same. No changes would be necessary for Scheme 1 other than reporting the FD basis size (if required). Scheme 2 could involve reporting the number of beams in each layer/layer-group instead of the aggregate beams, in addition to reporting the FD basis size (if required). Scheme 3 could include reporting a possibly additional parameter representing the number of beams in one or more of the layers/layer groups, in addition to reporting the FD basis size (if required).

One approach for higher rank transmission utilizes a separate subset of beams for each layer/layer group, where these subsets are possibly disjoint. If so, the bitmap reporting overhead can be meaningfully reduced since some beams are unutilized for a given layer. So, it could be more efficient to indicate only the utilized beams and report a smaller bitmap per layer which includes information corresponding to the utilized beams, resulting in a reduction in CSI feedback overhead without any loss of information.

The following summarizes each of the three schemes, where a general reporting format is as follows:
UCI-P1: No. of bits to be reported in UCI Part 1 to accommodate the proposed approach
UCI-P2: No. of bits to be reported in UCI Part 2 to accommodate the proposed approach
UCI-Total: No. of bits to be reported in both UCI Part 1 and UCI Part 2 to accommodate the proposed approach.
Scheme 1:
The UCI overhead of Scheme 1 for reporting the utilized beams for two layers/layer groups is as follows:
UCI-Part 1: 4L bits
UCI-P2: 0 bits
UCI-Total: 4L bits
The UCI overhead of Scheme 1 for reporting the utilized beams for R>2 layers/layer groups is as follows:
UCI-Part 1: 2LR bits
UCI-P2: 0 bits
UCI-Total: 2LR bits
Scheme 2:
The UCI overhead of Scheme 2 for reporting the utilized beams for two layers/layer groups is as follows:
UCI-P1: $\lceil \log_2 q'_L \rceil$ bits
UCI-P2: 4L bits
UCI-Total: $\lceil \log_2 q'_L \rceil$+4L bits
$q'_L$ indicates number of all possible values for sum of beams across layer groups
The UCI overhead of Scheme 2 for reporting the utilized beams for R layers/layer groups is as follows:
UCI-P1: $\lceil \log_2 q'_L \rceil$ bits
UCI-P2: 2LR bits
UCI-Total: $\lceil \log_2 q'_L \rceil$+2LR bits
$q'_L$ indicates number of all possible values for sum of beams across layers
Scheme 3:
Examples of the UCI Overhead of Scheme 3 for Reporting the Utilized Beams for Two Layers/Layer Groups
Report two beam bitmaps, $BP_x$ and $BP_{G1}$ ($BP_{Gk}$ represents the bitmap for layer-group k) as follows:
i) $BP_x$=BITXOR($BP_{G1}$,$BP_{G2}$). This bitmap is transmitted in UCI part 1. This bitmap provides locations of common beams across layer groups+total number of beams across layers.
ii) Let q=nnz($BP_x$), where nnz(s) is the number of non-zero entries in a vector s. Then we know we need at most 2(2L+q)M bits for coefficients bitmap, instead of 8LM bits, so thanks to $BP_x$ we can allocate an appropriate size of bitmaps for all layers.
iii) In UCI part 2, another 2L bitmap ($BP_{G1}$) representing location of utilized beams for layer group 1. Using $BP_x$ and $BP_{G1}$, now we know the locations of utilized beams for all layer groups, assuming that the 4 layers utilize all 2L beams. If R≤2, this bitmap is not sent.

Example 1

FIGS. 4-6 illustrate bit map diagrams identifying utilized beams for a pair of layer-groups, as well as a composite bit map diagram representative of multiple layer-groups, which is formed using an exclusive-or operation, in accordance with a first example. More particularly, FIG. 4 illustrates an example 400 of two potential beam bitmaps.

In the particular example illustrated, we know from $BP_{G1}$, $BP_{G2}$ that $L^*=L_{G1}+L_{G2}=5+6=11$.
1. Using $BP_x$=BITXOR($BP_{G1}$,$BP_{G2}$) we can obtain an upper bound on the total number of beams used, and
2. Using $BP_x$ and $BP_{G1}$ we can obtain $BP_{G2}$.

FIG. 5 illustrates $BP_x$ based on the values for $BP_{G1}$ and $BP_{G2}$ illustrated in FIG. 4. The locations of ones in $BP_x$ indicate the beams utilized only in one layer group, whereas the locations of zeros in $BP_x$ indicate the beams that were more likely utilized in both layer groups, but in some less likely instances may also correspond to instances in which a beam was utilized in neither.

From $BP_x$ we can deduce that $L^* \leq 2nz(BP_x)+nnz(BP_x)=2 \times 3+5=11$, where nz(s) is the number of zero entries in a vector s.

Now, as seen in FIG. 6, we can also determine $BP_{G2}$=XOR($BP_x$,$BP_{G1}$).

Example 2

The reason as to why we use the boldface expressions upper bound, more likely as well as the inequality in the equation for L* above, is elaborated in the further example illustrated in FIGS. 7-9. More particularly, FIG. 7 illustrates a different example 700 of two potential beam bitmaps.

From $BP_{G1}$, $BP_{G2}$ we know that $L^*=L_{G1}+L_{G2}=5+5=10$.

Next, we compute $BP_x$ as illustrated in FIG. 8.

Given $BP_x$, $2nz(BP_x)+nz(BP_x)=2 \times 4+4=12$ beams, hence we are assuming there are two more beams than there is in reality.

We can also determine $BP_{G2}$ given $BP_{G1}$ and $BP_x$ as illustrated in FIG. 9.

In the previous example, two unutilized beams were considered active because beam 3 was not utilized by any beam group. This would require slightly higher overhead. Nevertheless, $BP_{G2}$ was perfectly recovered without any errors.
The UCI Overhead of Scheme 3 for Reporting the Utilized Beams for Two Layers/Layer Groups is as Follows:
UCI-Part 1: 2L bits
UCI-P2: 2L bits
UCI-Total: 4L bits
The UCI Overhead of Scheme 3 for Reporting the Utilized Beams for R Layers/Layer Groups is as Follows
UCI-Part 1: 2L.$\lceil \log_2 R \rceil$ bits
UCI-P2: 2L(R−1) bits
UCI-Total: 2L.$\lceil \log_2 R \rceil$+2L(R−1) bits
In this case, the entries of $BP_x$ are each drawn from an alphabet of size R, i.e., {0, . . . , R−1}.

It may be well noted, that schemes 1-3 can further be modified in the following manner. For example, one may use beam bitmaps of size L rather than 2L to report utilized beams, and hence the same beam across both polarizations could have the same utilized/unutilized status per layer/layer-group.

Further, schemes 1-3 can be modified to the case where the FD basis size (M) is not the same across layers/layer-groups. Details of the schemes, as well as overhead calculations, are provided in the sequel.

FIGS. 10 and 11 illustrate tables providing a comparison between Schemes 1-3 for layer-group-based cases.
Setup: Variable beam allocation for two layers/layer groups. M is fixed.
Objective: Reduce total bitmap sizes to $M\Sigma L_r$, rather than 2LMR, where $L_r \leq 2L$.
Case A: Arbitrary Beams Per Layer-Group, Fixed M.

More specifically, FIGS. 10A and 10B are a table 1000 comparing multiple schemes for a case having arbitrary beams per layer group with fixed frequency domain basis size after frequency compression, across layer-groups.
Summary for Case where $M_{G1}=M_{G2}$. Layer-Group-Based Approach
Scheme 1:
UCI-P1: 4L bits
UCI-P2: 0 bits
UCI-Total: 4L bits
Scheme 2:
UCI-P1: $\lceil \log_2 q'_L \rceil$ bits
UCI-P2: 4L bits
UCI-Total: $\lceil \log_2 q'_L \rceil$+4L bits
$q'_L$ indicates all possible values for $L_{G1}+L_{G2}$.
  If the values of $L_{G1}$ and $L_{G2}$ are arbitrary, $q'_L=4L-1$ (to indicate $L_{G1}+L_{G2}$ varies from 2 to 4L)
  If $L_{G1} \leq \lceil 2L\alpha_{L1} \rceil$ and $L_{G2} < \lceil 2L\alpha_{L2} \rceil$, e.g., Case 2, then $q'_L = \lceil 2L\alpha_{L1} \rceil + \lceil 2L\alpha_{L2} \rceil - 1$.
Scheme 3:
UCI-P1: 2L bits
UCI-P2: 2L bits
UCI-Total: 4L bits
Case B: $M_{G2} \neq M_{G1}$. Layer-Group-Based Approach
  Assume $M_{G2}=\alpha_M M_{G1}$, where $\alpha_M \in \{\alpha_M^{(1)}, \alpha_M^{(2)}, \ldots\}$ and $\alpha_M$ is reported in UCI-P1. In that case $\lceil \log_2 |\alpha_M| \rceil$ extra bits are needed in UCI-P1.

In this instance, you now may need to know both $L_{G1}$ and $L_{G2}$ from UCI-P1 to set bitmaps $L_{G1} \times M_{G1}$ and $L_{G2} \times M_{G2}$ for layers 1,2 and 3,4, respectively. Recall that $L_{G1}+L_{G2}$ only was required when M was fixed since we needed to allocate a total of $2(L_{G1}+L_{G2})M$ bits for bitmaps.
Scheme 1:
  Two beam bitmaps of size 2L each are transmitted for each layer-group in UCI-P1, in addition to $\lceil \log_2 |\alpha_M| \rceil$ bits in UCI-P1 to indicate the FD basis size for each layer-group. Total overhead of UCI-P1 is $\lceil \log_2 |\alpha_M| \rceil$+4L bits, and no UCI-P2 bits are needed. Total UCI bits is then $\lceil \log_2 |\alpha_M| \rceil$+4L bits.

FIG. 11 is a table 1100 comparing multiple schemes for a case having arbitrary beams per layer group with an unequal frequency domain basis size after frequency compression, across layer-groups, where the frequency domain basis size for layer-group 2 is less (or equal) the frequency domain basis size for layer group 1.
Summary for Case where $M_{G2} \leq M_{G1}$.
Scheme 1:
UCI-P1: 4L+$\lceil \log_2 |\alpha_M| \rceil$ bits
UCI-P2: 0 bits
UCI-Total: 4L+$\lceil \log_2 |\alpha_M| \rceil$ bits Scheme 1 can be extended to the case where R>2 beam bitmaps of size 2L each are transmitted in UCI-P1, along with the $\lceil \log_2 |\alpha_M| \rceil$ bits in UCI-P1 to indicate the FD basis size for each layer-group.
Scheme 2:
UCI-P1: $\lceil \log_2 q''_L \rceil + \lceil \log_2 |\alpha_M| \rceil$ bits
UCI-P2: 4L bits
UCI-Total: $\lceil \log_2 q''_L \rceil + \lceil \log_2 |\alpha_M| \rceil$+4L bits
$q''_L$ indicates all possible values for the pair $\{L_{G1}, L_{G2}\}$.
  If $L_{G1}$ and $L_{G2}$ are arbitrary, $q''_L=(2L)^2$
  If $L_{G1} \leq 2L\alpha_{L1}$ and $L_{G2} < 2L\alpha_{L2}$ where $\alpha_{L1}$, $\alpha_{L2}$ are fixed/higher-layer-configured, then $q''_L = \lceil 2L\alpha_{L1} \rceil \times \lceil 2L\alpha_{L2} \rceil$.

Scheme 2 can be extended to the case where R beam bitmaps of size 2L each are transmitted in UCI-P2, and $q''_L$ (signaled in UCI-P1) would indicate all possible values for the R-tuple $\{L_1, \ldots, L_R\}$, along with the $\lceil \log_2 |\alpha_M| \rceil$ bits in UCI-P1 to indicate the FD basis size for each layer-group.
Scheme 3:
UCI-P1: 2L+$\lceil \log_2 q^*_L \rceil + \lceil \log_2 |\alpha_M| \rceil$ bits
UCI-P2: 2L bits
UCI-Total: $\lceil \log_2 q^*_L \rceil + \lceil \log_2 |\alpha_M| \rceil$+4L bits
$q^*_L$ indicates the number of possible values for either $L_{G1}$ or $L_{G2}$, whichever has a smaller size
  If $L_{G1}$ and $L_{G2}$ are arbitrary, $q^*_L=2L$
  If $L_{G1} \leq 2L\alpha_{L1}$ and $L_{G2} < 2L\alpha_{L2}$ where $\alpha_{L1}$, $\alpha_{L2}$ are fixed/higher-layer-configured, then $q^*_L = \min(\lceil 2L\alpha_{L1} \rceil, \lceil 2L\alpha_{L2} \rceil)$.

Scheme 3 can be extended to the case with R>2, where R-1 beam bitmaps of size 2L each are transmitted in UCI-P2, and $q^*_L$ (signaled in UCI-P1) would indicate all possible values for the (R-1)-tuple $\{L_1, \ldots, L_R\}$, and the size-2L map $BP_x$ (whose entries are drawn from an alphabet of size R, and hence 2L. $\lceil \log_2 R \rceil$ bits are needed to report $BP_x$), along with the $\lceil \log_2 |\alpha_M| \rceil$ bits in UCI-P1 to indicate the FD basis size for each layer-group.
Note that $q^*_L \leq q''_L$ for all cases.

Figure 12:
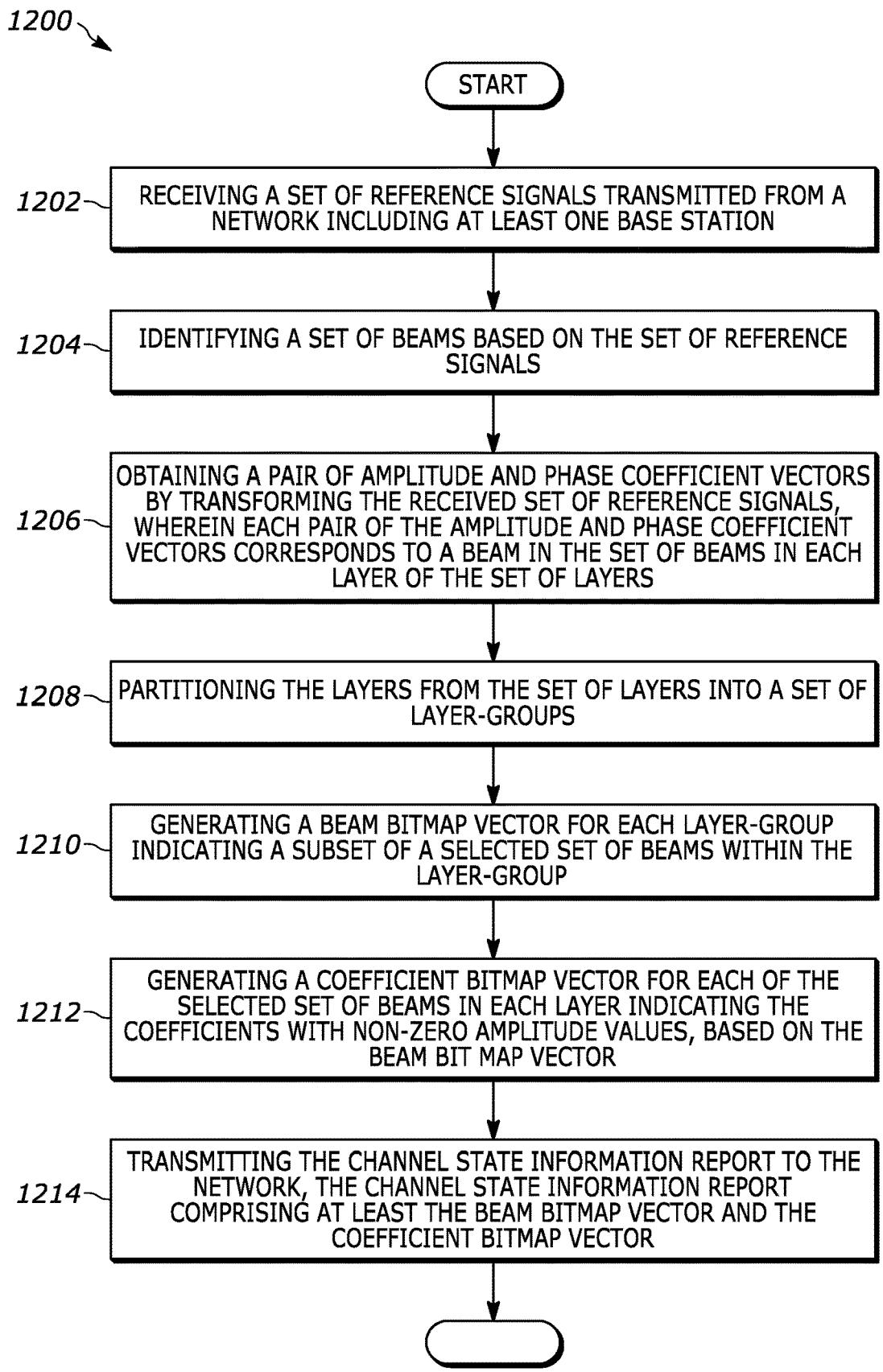
FIG. 12 is a flow diagram in a user equipment for generating a channel state information report having information corresponding to a set of layers.

FIG. 12 illustrates a flow diagram 1200 in a user equipment for generating a channel state information report having information corresponding to a set of layers. The method includes receiving 1202 a set of reference signals transmitted from a network including at least one base station. A set of beams are identified 1204 based on the set of reference signals. A pair of amplitude and phase coefficient vectors are obtained 1206 by transforming the received set of reference signals, wherein each pair of the amplitude and phase coefficient vectors corresponds to a beam in the set of beams in each layer of the set of layers. The layers from the set of layers are partitioned 1208 into a set of layer-groups. A beam bitmap vector is generated 1210 for each layer-group indicating a subset of a selected set of beams within the layer-group. A coefficient bitmap vector is generated 1212 for each of the selected set of beams in each layer indicating the coefficients with non-zero amplitude values, based on the beam bit map vector. The channel state information report is transmitted 1214 to the network, the channel state information report comprising at least the beam bitmap vector and the coefficient bitmap vector.

In some instances, the beam bitmap vector for each layer group can indicate the beams selected by at least one of the layers within the layer-group.

In some instances, the channel state information report can be partitioned into at least two parts. In some of these instances, the beam bitmap vector for each layer group can be reported in a preselected part of the at least two parts of the channel state information report, whereas the coefficient bitmap vector for each layer is reported in a part of the channel state information report, which is subsequent to the preselected part.

In other of these instances, an indication of a sum of cardinalities of the subset of the selected set of beams across layer-groups can be reported in a preselected part of the at least two parts of the channel state information report, whereas the beam bitmap vector corresponding to each layer-group as well as the coefficient bitmap vector corresponding to each layer are reported in a part of the channel state information report, which is subsequent to the preselected part. Further, the indication of a sum of cardinalities reported in the preselected part of the at least two parts of the channel state information report can represent a composite value of the sum of selected beams for each layer-group.

In still other of these instances, an entry in the beam bitmap vector can have a particular binary value if the corresponding beam belongs to the beam subset vector, whereas an entry in the beam bitmap vector has a complement binary value, which is a complement of the particular binary value, if the corresponding beam does not belong to the beam subset vector. Further, an element-wise function of the beam bitmap vectors for two or more layer groups can be reported in a preselected part of the at least two parts of the channel state information report, whereas the coefficient bitmap vector for each layer and beam bitmap vectors are reported in a part of the channel state information report, which is subsequent to the preselected part. An additional indicator can be reported in the preselected part of the at least two parts of the channel state information report that reflects the sum of the selected beams for each of a subset of the layer-groups, which includes less than all of the layer-groups.

In some instances, the length of a beam bitmap vector for each layer-group is the number of selected beams in each polarization.

Figure 13:
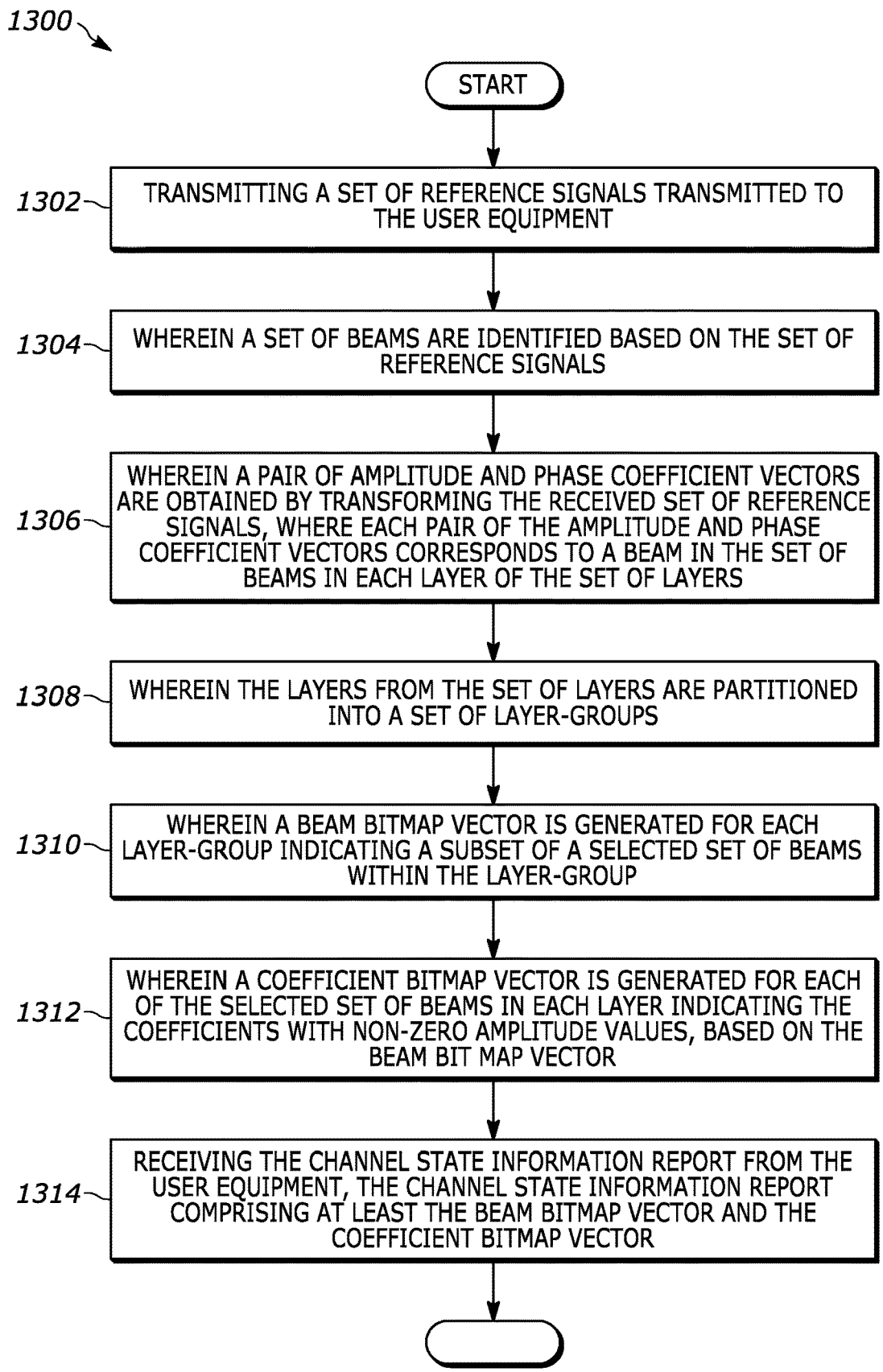
FIG. 13 is a flow diagram in a network for generating a channel state information report having information corresponding to a set of layers.

FIG. 13 illustrates a flow diagram 1300 in a network associated with receiving a channel state information report having information corresponding to a set of layers. The method includes transmitting 1302 a set of reference signals transmitted to the user equipment. A set of beams are identified 1304 based on the set of reference signals. A pair of amplitude and phase coefficient vectors are obtained 1306 by transforming the received set of reference signals, where each pair of the amplitude and phase coefficient vectors corresponds to a beam in the set of beams in each layer of the set of layers. The layers from the set of layers are partitioned 1308 into a set of layer-groups. A beam bitmap vector is generated 1310 for each layer-group indicating a subset of a selected set of beams within the layer-group. A coefficient bitmap vector is generated 1312 for each of the selected set of beams in each layer indicating the coefficients with non-zero amplitude values, based on the beam bit map vector. The channel state information report is received 1314 from the user equipment, the channel state information report including at least the beam bitmap vector and the coefficient bitmap vector.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 14:
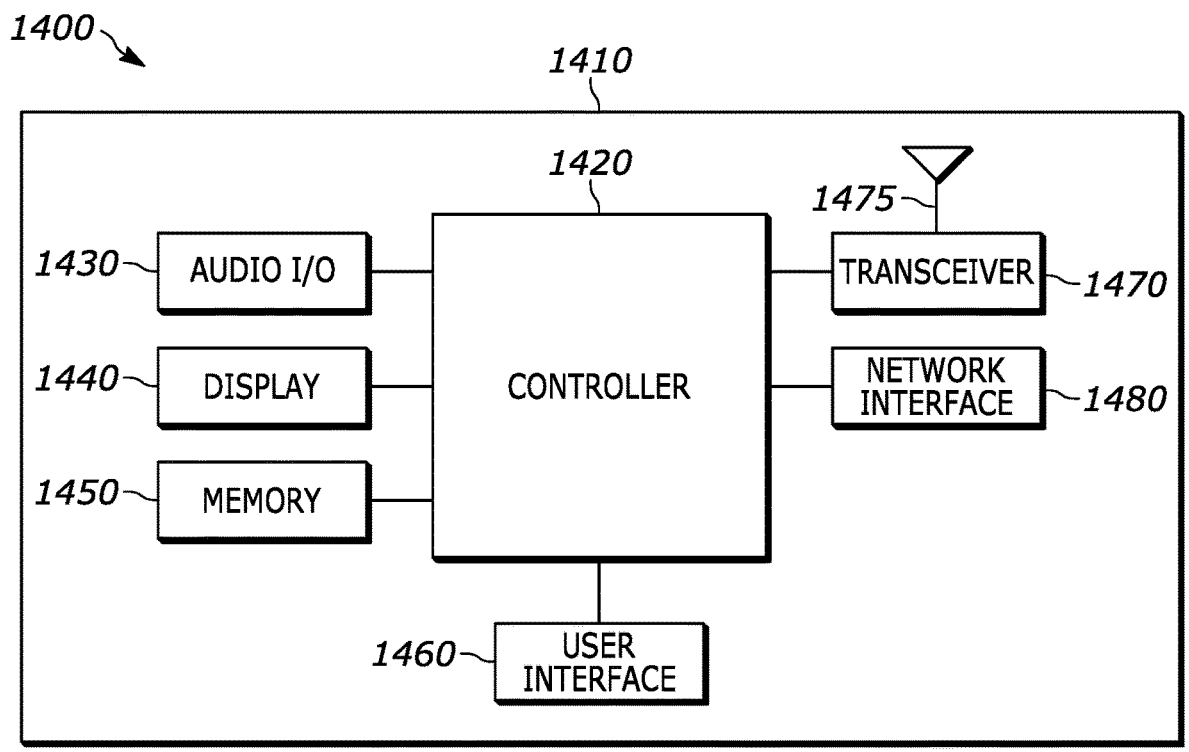
FIG. 14 is an example block diagram of an apparatus according to a possible embodiment.

FIG. 14 is an example block diagram of an apparatus 1400, such as the UE 110, the network entity 120, or any other wireless communication device disclosed herein, according to a possible embodiment. The apparatus 1400 can include a housing 1410, a controller 1420 coupled to the housing 1410, audio input and output circuitry 1430 coupled to the controller 1420, a display 1440 coupled to the controller 1420, a memory 1450 coupled to the controller 1420, a user interface 1460 coupled to the controller 1420, a transceiver 1470 coupled to the controller 1420, at least one antenna 1475 coupled to the transceiver 1470, and a network interface 1480 coupled to the controller 1420. The apparatus 1400 may not necessarily include all of the illustrated elements and/or may include additional elements for different embodiments of the present disclosure. The apparatus 1400 can perform the methods described in all the embodiments.

The display 1440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1470 can be one or more transceivers that can include a transmitter and/or a receiver. The audio input and output circuitry 1430 can include a microphone, a speaker, a transducer, or any other audio input and output circuitry. The user interface 1460 can include a keypad, a keyboard, buttons, a touch pad, a joystick, a touch screen display, another additional display, or any other device useful for providing an interface between a user and an electronic device. The network interface 1480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 1450 can include a Random Access Memory (RAM), a Read Only Memory (ROM), an optical memory, a solid state memory, a flash memory, a removable memory, a hard drive, a cache, or any other memory that can be coupled to an apparatus.

The apparatus 1400 or the controller 1420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 1450, elsewhere on the apparatus 1400, in cloud storage, and/or anywhere else that can store software and/or an operating system. The apparatus 1400 or the controller 1420 may also use hardware to implement disclosed operations. For example, the controller 1420 may be any programmable processor. Furthermore, the controller 1420 may perform some or all of the disclosed operations. For example, some operations can be performed using cloud computing and the controller 1420 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1420 may be any controller or processor device or devices capable of operating an apparatus and implementing the disclosed embodiments. Some or all of the additional elements of the apparatus 1400 can also perform some or all of the operations of the disclosed embodiments. At least some embodiments can provide a method and apparatus for generating a channel state information report having information corresponding to a set of layers.

At least some methods of this disclosure can be implemented on a programmed processor. However, the controllers, flowcharts, and/or modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment for generating a channel state information report having information corresponding to a set of layers, the method comprising:
   receiving a set of reference signals transmitted from a network including at least one base station;
   identifying a set of beams based on the set of reference signals;
   obtaining a pair of amplitude and phase coefficient vectors, which includes an amplitude coefficient vector and a phase coefficient vector, by transforming the received set of reference signals, wherein each pair of the amplitude and phase coefficient vectors corresponds to a beam in the set of beams in each layer of the set of layers;
   partitioning the layers from the set of layers into a set of layer-groups;
   generating a beam bitmap vector for each layer-group indicating a subset corresponding to a selected set of beams within the layer-group, which excludes from the selected set of beams any beams having no non-zero coefficient values in the corresponding obtained amplitude coefficient vector;
   generating a coefficient bitmap vector for each of the selected set of beams in each layer indicating particular coefficients of each of the respective beams from the selected set identified in the beam bitmap vector that have non-zero amplitude values; and
   transmitting the channel state information report to the network, the channel state information report comprising at least the beam bitmap vector and the coefficient bitmap vector.

2. The method in accordance with claim 1, wherein the beam bitmap vector for each layer group indicates the beams selected by at least one of the layers within the layer-group.

3. The method in accordance with claim 1, wherein the channel state information report is partitioned into at least two parts.

4. The method in accordance with claim 3, wherein the beam bitmap vector for each layer group is reported in a preselected part of the at least two parts of the channel state information report, whereas the coefficient bitmap vector for each layer is reported in a part of the channel state information report, which is subsequent to the preselected part.

5. The method in accordance with claim 3, wherein an indication of a sum of cardinalities of the subset of the selected set of beams across layer-groups is reported in a preselected part of the at least two parts of the channel state information report, whereas the beam bitmap vector corresponding to each layer-group as well as the coefficient bitmap vector corresponding to each layer are reported in a part of the channel state information report, which is subsequent to the preselected part.

6. The method in accordance with claim 5, wherein the indication of a sum of cardinalities reported in the preselected part of the at least two parts of the channel state information report represents a composite value of the sum of selected beams for each layer-group.

7. The method in accordance with claim 3, wherein an entry in the beam bitmap vector has a particular binary value if the corresponding beam belongs to the beam subset vector, whereas an entry in the beam bitmap vector has a complement binary value, which is a complement of the particular binary value, if the corresponding beam does not belong to the beam subset vector.

8. The method in accordance with claim 7, wherein an element-wise function of the beam bitmap vectors for two or more layer groups is reported in a preselected part of the at least two parts of the channel state information report, whereas the coefficient bitmap vector for each layer and beam bitmap vectors are reported in a part of the channel state information report, which is subsequent to the preselected part.

9. The method in accordance with claim 8, wherein an additional indicator is reported in the preselected part of the at least two parts of the channel state information report that reflects the sum of the selected beams for each of a subset of the layer-groups, which includes less than all of the layer-groups.

10. The method in accordance with claim 1, wherein the length of a beam bitmap vector for each layer-group is the number of selected beams in each polarization.

11. A user equipment for generating a channel state information report having information corresponding to a set of layers, the user equipment comprising:
a transceiver that receives a set of reference signals transmitted from a network including at least one base station; and
a controller that identifies a set of beams based on the set of reference signals, obtains a pair of amplitude and phase coefficient vectors, which includes an amplitude coefficient vector and a phase coefficient vector, by transforming the received set of reference signals, wherein each pair of the amplitude and phase coefficient vectors corresponds to a beam in the set of beams in each layer of the set of layers, partitions the layers from the set of layers into a set of layer-groups, generates a beam bitmap vector for each layer-group indicating a subset corresponding to a selected set of beams within the layer-group, which excludes from the selected set of beams any beams having no non-zero coefficient values in the corresponding obtained amplitude coefficient vector, and generates a coefficient bitmap vector for each of the selected set of beams in each layer indicating particular coefficients of each of the respective beams from the selected set identified in the beam bitmap vector that have non-zero amplitude values;
wherein the transceiver further transmits the channel state information report to the network, the channel state information report comprising at least the beam bitmap vector and the coefficient bitmap vector.

12. The user equipment in accordance with claim 11, wherein the beam bitmap vector for each layer group indicates the beams selected by at least one of the layers within the layer-group.

13. The user equipment in accordance with claim 11, wherein the channel state information report is partitioned into at least two parts.

14. The user equipment in accordance with claim 13, wherein the beam bitmap vector for each layer group is reported in a preselected part of the at least two parts of the channel state information report, whereas the coefficient bitmap vector for each layer is reported in a part of the channel state information report, which is subsequent to the preselected part.

15. The user equipment in accordance with claim 13, wherein an indication of a sum of cardinalities of the subset of the selected set of beams across layer-groups is reported in a preselected part of the at least two parts of the channel state information report, whereas the beam bitmap vector corresponding to each layer-group as well as the coefficient bitmap vector corresponding to each layer are reported in a part of the channel state information report, which is subsequent to the preselected part.

16. The user equipment in accordance with claim 15, wherein the indication of a sum of cardinalities reported in the preselected part of the at least two parts of the channel state information report represents a composite value of the sum of selected beams for each layer-group.

17. The user equipment in accordance with claim 13, wherein an entry in the beam bitmap vector has a particular binary value if the corresponding beam belongs to the beam subset vector, whereas an entry in the beam bitmap vector has a complement binary value, which is a complement of the particular binary value, if the corresponding beam does not belong to the beam subset vector.

18. The user equipment in accordance with claim 17, wherein an element-wise function of the beam bitmap vectors for two or more layer groups is reported in a preselected part of the at least two parts of the channel state information report, whereas the coefficient bitmap vector for each layer and beam bitmap vectors are reported in a part of the channel state information report, which is subsequent to the preselected part.

19. The user equipment in accordance with claim 18, wherein an additional indicator is reported in the preselected part of the at least two parts of the channel state information report that reflects the sum of the selected beams for each of a subset of the layer-groups, which includes less than all of the layer-groups.

20. The user equipment in accordance with claim 11, wherein the length of a beam bitmap vector for each layer-group is the number of selected beams in each polarization.

* * * * *